United States Patent [19]

Romano

[11] Patent Number: 4,903,799
[45] Date of Patent: Feb. 27, 1990

[54] BRAKE-OPERATING LEVER, WITH AN ADJUSTABLE TRANSMISSION RATIO

[76] Inventor: Antonio Romano, Via Paruta 32, Padova, Italy

[21] Appl. No.: 245,114

[22] Filed: Sep. 16, 1988

[30] Foreign Application Priority Data

Oct. 2, 1987 [IT] Italy .................. 67838 A/87

[51] Int. Cl.⁴ .................. B60T 1/00; G05G 11/00; G05G 1/04; F16C 1/10
[52] U.S. Cl. .................. 188/20; 74/489; 74/502.2; 74/516
[58] Field of Search .......... 188/2 D, 24.15; 74/489, 74/502.2, 516, 522

[56] References Cited

U.S. PATENT DOCUMENTS

3,752,005  8/1973  Yoshikawa .................. 74/489 X
4,222,285  9/1980  Kine .................. 74/489 X

FOREIGN PATENT DOCUMENTS

1008052  10/1965  United Kingdom .............. 74/502.2

Primary Examiner—Robert J. Oberleitner
Attorney, Agent, or Firm—Trask, Britt & Rossa

[57] ABSTRACT

In a brake-operating device for cycles, motorcycles and the like, of the type comprising a lever articulated to a support structure and connected to a flexible brake-operating cable by an auxiliary member is provided for adjusting the distance between the axis of articulation of the lever and the axis of the flexible cable near the point of connection of the flexible cable to the lever.

11 Claims, 4 Drawing Sheets

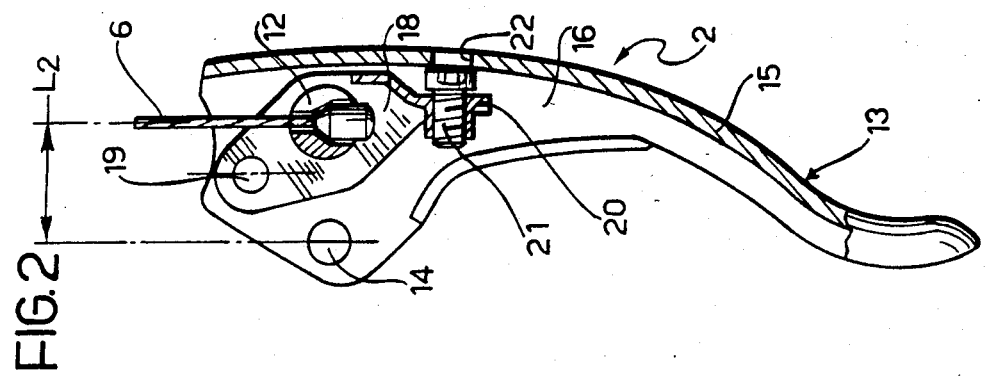
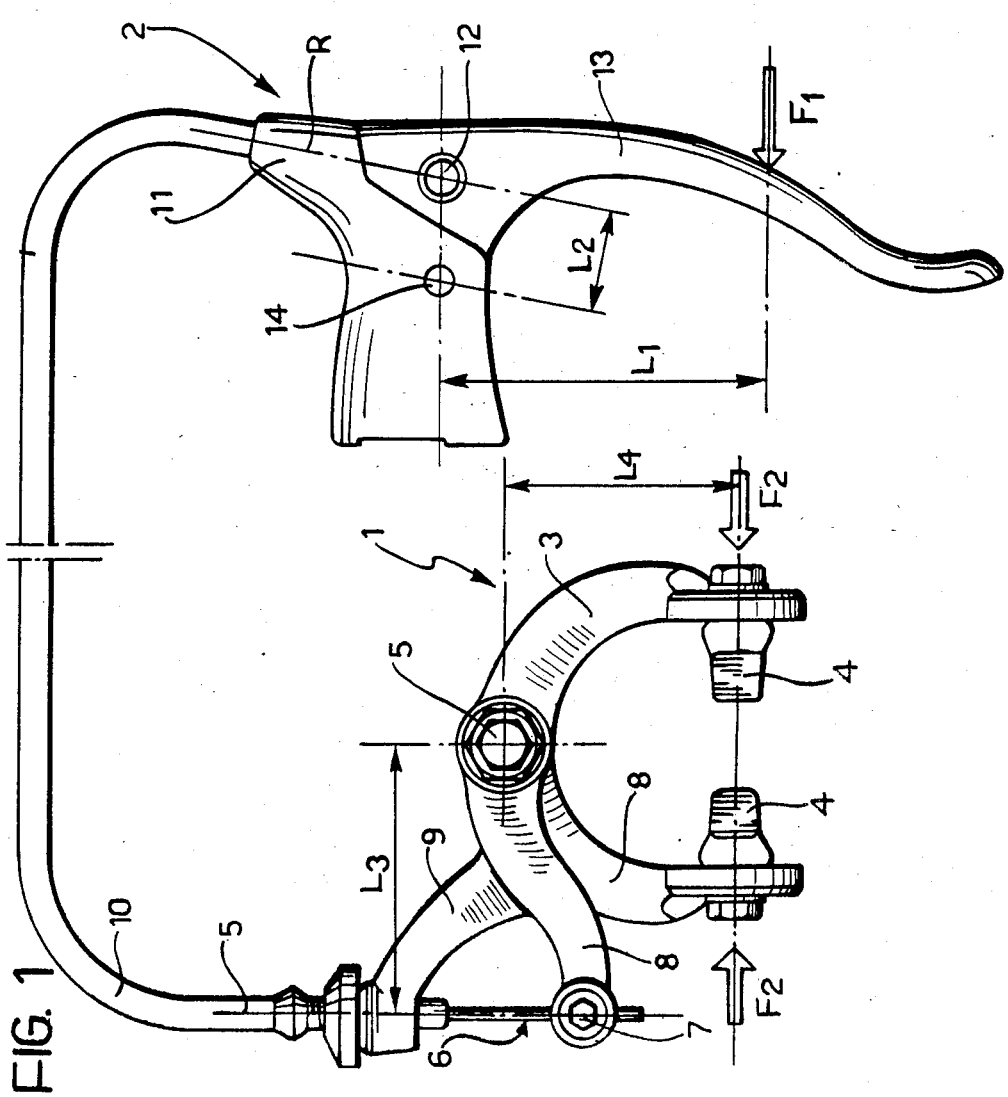

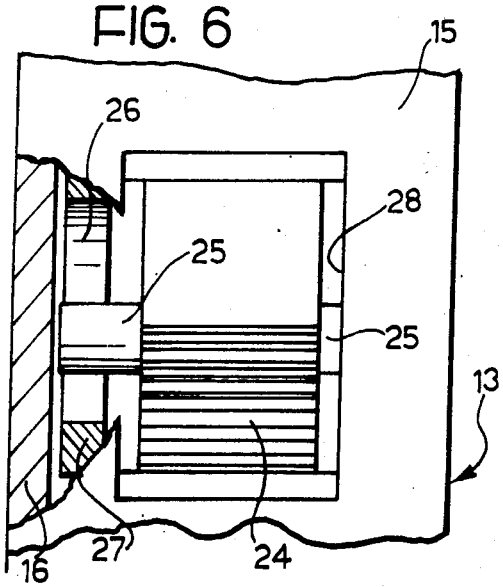
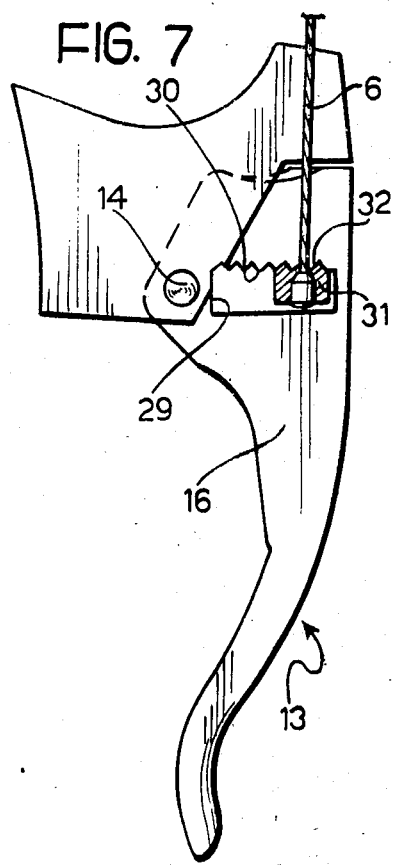
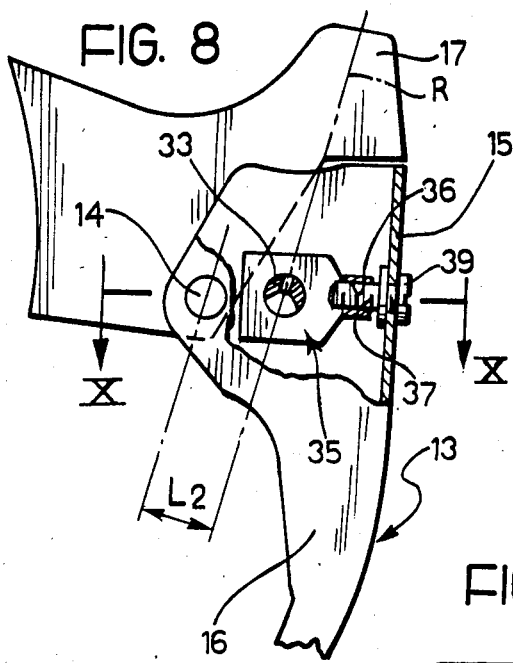
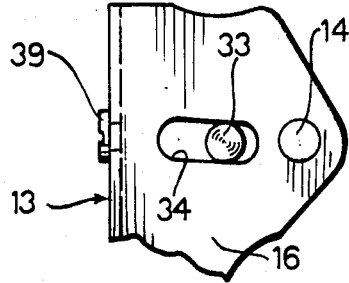
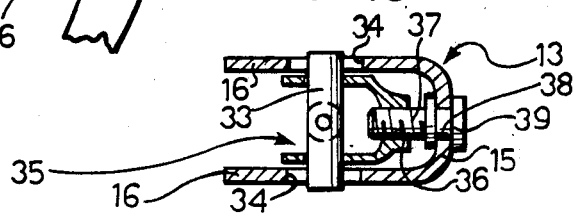

BRAKE-OPERATING LEVER, WITH AN ADJUSTABLE TRANSMISSION RATIO

DESCRIPTION

1. Field

The present invention relates to a brake-operating device for cycles, motorcycles and the like, of the known type comprising a lever articulated to a support structure and connected to a flexible brake-operating cable.

2. Statement of the Art

FIGS. 1 and 11 of the appended drawings shows a conventional bicycle brake 1 and its operating device 2. The brake 1 comprises a pair of calipers 3 carrying a pair of braking blocks 4 for engaging the rim of a wheel of the bicycle from opposite sides. The calipers 3 are articulated at 5 to their support structure (not illustrated) and are biassed towards an open position by resilient means 6A.

The two calipers 3 can be brought towards a closed braking position by means of a flexible metal cable 6. The cable 6 has an end which is fixed to one end 7 of an operating arm 8 integral with one of the two calipers 3. The other caliper carries an operating arm 9 to which is fixed one end of a sheath 10 within which the cable 6 is slidably mounted. The opposite end of the sheath 10 is fixed to a support structure 11 fixed firmly to the bicycle handlebars, whilst the corresponding end of the cable 6 is fixed to a pin 12 which is carried by an operating lever 13 articulated to the support structure 11 about an axis 14. The resilient means associated with the two calipers 3 keep the lever 13 in the position illustrated in FIG. 1, by means of the cable 6. Braking can be achieved by the manual rotation of the lever 13 about its articulation 14 in a clockwise sense (with reference to FIG. 1). In FIG. 1, the resultant force applied to the lever 13 by the cyclist's hand is indicated $F_1$. The line of the force $F_1$ is at a distance $L_1$ from the articulation axis 14 of the lever. Moreover, the axis R of the flexible cable near the fixing pin 12 is spaced from the axis 14 by a distance $L_2$. The action of a hand on the lever 13 therefore produces a pulling force on the cable 6 which is equal to $F_1 L_1 / L_2$. If the distance of the articulation axis 5 of the two calipers 3 from the line of the flexible cable at that point is equal to $L_3$, the pulling force applied to the cable 6 produces a braking moment about the axis 5 which is equal to $F_1 L_1 L_3 / L_2$. If $F_2$ is the force applied to each braking block along a line spaced from the axis 5 by a distance $L_4$, the braking moment expressed above is also equal to $F_2 L_4$. The ratio between the force $F_1$ applied by the hand and the force $F_2$ applied to the wheel by the braking blocks is consequently as follows:

$$F_1/F_2 = L_2 L_4 / L_1 L_3.$$

In known solutions, the distances $L_1$, $L_2$, $L_3$, $L_4$ are fixed. The ratio $F_1/F_2$ is therefore constant. It may therefore occur that effectiveness of the braking does not correspond to the expectations of the rider, since the anatomy and muscular force of the hand may vary from rider to rider and also since the frictional conditions of the transmission system and of the block/rim unit may perhaps vary.

In the above conventional systems, the rider can control the effectiveness of the braking only by varying the force $F_1$ applied to the brake-operating lever.

SUMMARY OF THE INVENTION

The object of the present invention is to produce a brake-operating device which has an adjustable transmission ratio.

The main characteristic of the device according to the invention lies in the fact that it includes means for adjusting the distance between the axis of articulation of the operating lever and the axis of the flexible cable near the point of connection of the flexible cable to the lever. In particular, the flexible cable is connected to an auxiliary member carried by the brake-operating lever, means being provided for adjusting the position of the auxiliary member relative to the lever.

By virtue of these characteristics, the braking conditions can be optimised in dependence on the individual requirement of the user, enabling a change from gentler braking to sharper braking or vice verse to be made with a quick and easy operation.

The invention will now be described with reference to the appended drawings, provided purely by way of non-limiting example, in which;

BRIEF DESCRIPTION OF THE DRAWINGS

FIG. 1 shows a conventional brake with a conventional operating device (this drawing has been described in the introduction to the present description), FIG. 2 is a sectional view of a first embodiment of the operating device according to the invention, FIG. 7 shows a third embodiment, FIG. 8 is a partially-sectioned view of a fourth embodiment, FIG. 9 shows a detail of the device of FIG. 8, and FIG. 10 is a section taken on the line X of FIG. 8.

DESCRIPTION OF THE DRAWINGS

Figure 4:
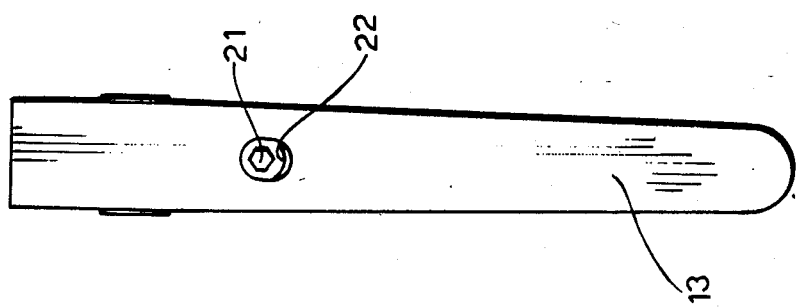
FIG. 4 is a front view of the device of FIGS. 2 and 3, FIGS. 5 and 6 are a section and a partially-sectioned front view of a second embodiment of the device according to the invention.
Figure 3:
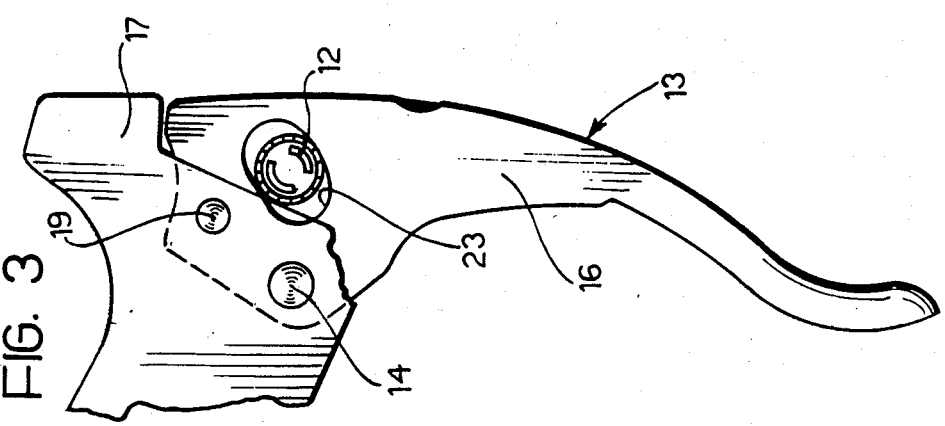
FIG. 3 is a side view of the operating device of FIG. 2.
Figure 11:
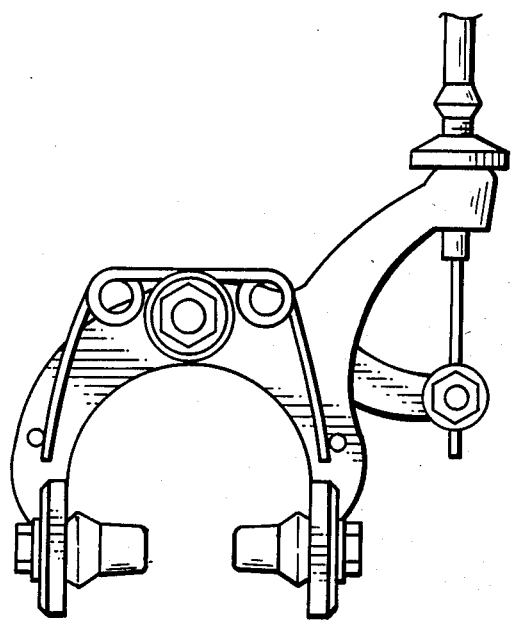
FIG. 11 shows the conventional brake having a resilient biasing means mounted thereon.

With reference to FIGS. 2 to 4, the operating device 2 includes an operating lever 13 which, as in conventional solutions, has a U-shaped cross-section defined by a front wall 15 and two sides 16. Also like conventional solutions, the operating lever 13 is articulated at 14 to a support structure 17.

The main difference from conventional solutions consists of the fact that, as well as being fixed directly to the lever 13, the pin 12 for the fixing of the flexible cable 6 is fixed to an auxiliary lever 18 which is articulated at 19 to the operating lever 13 by means of a pin whose ends engage the two sides 16 of the lever 13.

The auxiliary lever 18 has an appendage 20 with a threaded hole into which a screw 21 is screwed. The resilient means for biassing the brake calipers tend to pivot the auxiliary lever 18 anticlockwise (with reference to FIG. 2) by means of the flexible cable 6, so as to thrust the head of the screw 21 against the inner surface of the front wall 15 of the lever. The head of the screw has a recess for the engagemtn of an operating key, which can be reached through an aperture 22 formed in the wall 15.

The position of the lever 18 relative to the lever 13 is adjusted by the screwing in or unscrewing of the screw 21. When the brake is not in operation, the head of the screw 21 is kept in contact with the wall 15 by the pull exerted by the flexible cable 6. When the brake is operated by the pivoting of the lever 13 in the clockwise sense (with reference to FIG. 2) the head of the screw 21 continues to be held in contact with the wall 13. Since the axes of articulation of the lever 18 and the lever 13 do not coincide, the two side walls 16 of the lever 15 have two respective slots 23 (FIG. 3) for the engagement of the pin 12.

As already indicated above, the adjustment of the position of the screw causes an adjustment of the position of the lever 18 relative to the lever 13 and consequently a variation in the distance $L_2$ between the articulation axis 14 of the lever 13 and the line of the flexible cable 6 near the anchoring pin 12.

Figure 5:
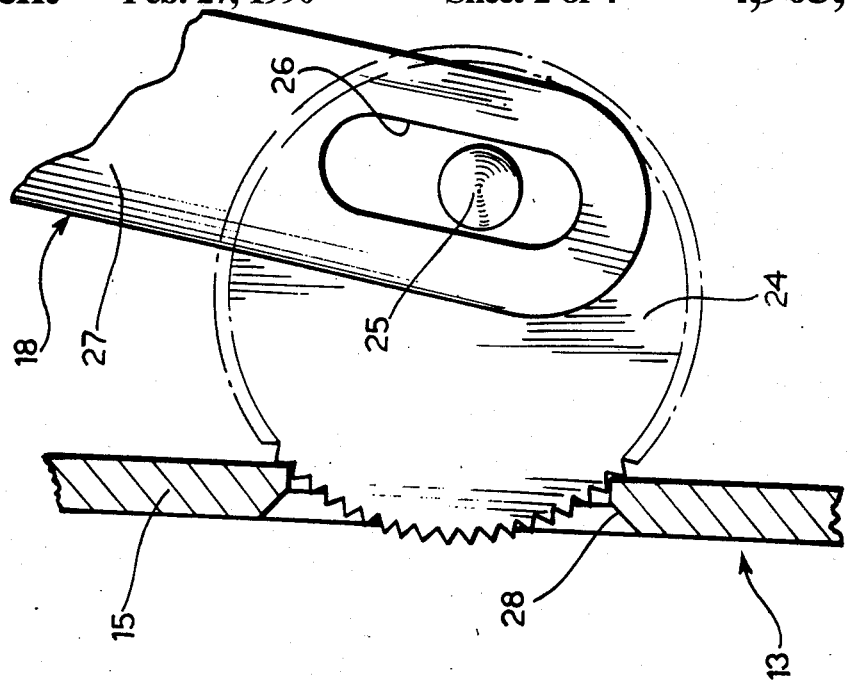

FIGS. 5 and 6 show a variant of the embodiment shown in FIGS. 2–4. In the case of the variant of FIGS. 5 and 6, the pin 12 is also carried by the auxiliary lever 18. However, a sprocket 24 is provided instead of the screw 21 and, on its two opposite faces, has two eccentric pins 25 which engage two respective slots 26 formed in two parallel appendages 27 of the lever 18. The pull exerted by the cable 6 holds the lever 18 with the sprocket 24 against the front wall 15 of the lever 13, as in the case of FIG. 2. The wall 15 has an aperture 28 by means of which it is possible to reach the toothed surface of the sprocket 24. It is thus possible to rotate the sprocket manually so as to cause a variation in the angular position of the two eccentric pins 5 and consequently a rotation of the lever 18 relative to the lever 13. The position of the pin 12 (not shown in FIGS. 5,6) carried by the lever 18 can thus be adjusted relative to the articulation axis 14 (also not visible in FIGS. 5, 6) of the lever articulation axis 14 of the operating lever and the 13.

FIG. 7 shows a further embodiment in which the two side walls 16 of the braking lever have two respective slots 29, each having an upper toothed edge 30. The flexible cable 6 is anchored to an element 31 having a toothed surface 32 which engages the two toothed edges 30 of the two slots and is urged against these edges by the pull exerted by the cable 6. The adjustment of the distance of the cable from the articulation axis 14 of the lever is carried out by the manual movement of the element 31 away from the two toothed edges 30 of the slots 29 and its re-engagement against these edges in a different position.

In the case of the embodiment illustrated in FIGS. 8 to 10, the flexible cable 6 is anchored to a pin 33 whose ends are slidably engaged in two slots 34 formed in the two side walls 16 of the brake-operating lever 13. A forked element 35 with two cheeks fixed to the pin 33 and a central part having a threaded hole 36 in which a screw 37 is engaged is disposed between the two side walls 16. The screw 37 passes through a hole 38 in the front wall 15 of the operating lever and has a head 39 in abutment with the outer surface of the front wall 15. The position of the pin 33 relative to the two slots 34, and consequently the distance between the line of the flexible cable, indicated R in FIG. 8, can be adjusted by acting on the screw 37.

Naturally, the principle of the invention remaining the same, the forms of embodiment and details of construction may be varied widely with respect to those described and illustrated, without thereby departing from the scope of the present invention.

What is claimed is:

1. A brake-operating device for cycles, motorcycles and the like, comprising a lever, a support structure to which the lever is articulated about an axis, and a flexible brake-operating cable connected to the lever,
   wherein the device also includes means for selectively adjusting the distance between the axis of articulation of the lever and a point of connection of the flexible cable to the lever, said means operating to maintain the selected distance constant throughout a rotation of the lever about its axis of articulation.

2. A device according to claim 1, wherein the flexible cable is connected to an auxiliary member carried by the brake-operating lever and means are provided for adjusting the position of the auxiliary member relative to the lever.

3. A device according to claim 2, wherein the auxiliary member is articulated to the lever about an axis which is spaced from the articulation axis of the lever.

4. A device according to claim 3, wherein resilient biassing means are associated with the brake and wherein the means for adjusting the position of the auxiliary member relative to the brake-operating lever comprise a screw which is engaged in an appendage of the auxiliary member and has its head urged against a wall of the lever as a result of the pull exerted through the flexible cable by the resilient biassing means associated with the brake.

5. A device according to claim 3, wherein resilient biassing means are associated with the brake and wherein the means for adjusting the position of the auxiliary member relative to the brake-operating lever comprise a sprocket which carries at least one eccentric pin and a slot which is formed in the auxiliary member and is engaged by said at least one eccentric pin, the sprocket being urged against a wall of the lever as a result of the pull exerted through the flexible cable by the resilient biassing means associated with the brake, the wall of the lever having an aperture for access to the sprocket.

6. A device according to claim 2, wherein resilient biassing means are associated with the brake and wherein the auxiliary member and the lever have corresponding toothed surfaces, the toothed surface of the auxiliary member being urged into engagement with a region of the toothed surface of the lever as a result of the pull exerted through the flexible cable by the resilient biassing means associated with the brake.

7. A device according to claim 2, wherein the auxiliary member is constituted by a pin guided slidably in the operating lever and provided with an appendage which defines a threaded hole, an adjustment screw being engageable in said hole.

8. A brake-operating device for cycles, motorcycles and the like, comprising:
   a lever;
   a support structure to which the lever is articulated about an axis;
   an auxiliary member carried by the brake-operating lever, the auxiliary member being articulated to the lever about an axis which is spaced from the articulation axis of the lever;
   means provided for adjusting the position of the auxiliary member relative to the lever;

a resilient biasing means associated with the brake;

a flexible brake-operating cable connected to the lever; and means for adjusting the distance between the axis of articulation of the lever and an axis of the flexible cable near the point of connection of the flexible cable to the lever, comprising a screw engaged in an appendage of the auxiliary member having its head urged against a wall of the lever as a result of the pull exerted through the flexible cable by the resilient biasing means associated with the brake.

9. A brake-operating device for cycles, motorcycles and the like, comprising:

a lever;

a support structure to which the lever is articulated about an axis;

an auxiliary member carried by the brake-operating lever, the auxiliary member being articulated to the lever about an axis which is spaced from the articulation axis of the lever;

means provided for adjusting the position of the auxiliary member relative to the lever;

a flexible brake-operating cable connected to the lever; and means for adjusting the distance between the axis of articulation of the lever and an axis of the flexible cable near the point of connection of the flexible cable to the lever;

wherein resilient biassing means are associated with the brake and wherein the means for adjusting the position of the auxiliary member relative to the brake-operating lever comprise a sprocket which carries at least one eccentric pin and a slot which is formed in the auxiliary member and is engaged by said at least one eccentric pin, the sprocket being urged against a wall of the lever as a result of the pull exerted through the flexible cable by the resilient biassing means associated with the brake, the wall of the lever having an aperture for access to the sprocket.

10. A brake-operating device for cycles, motorcycles and the like, comprising:

a lever;

a support structure to which the lever is articulated about an axis;

an auxiliary member carried by the brake-operating lever;

means provided for adjusting the position of the auxiliary member relative to the lever;

a flexible brake-operating cable connected to the lever; and means for adjusting the distance between the axis of articulation of the lever and an axis of the flexible cable near the point of connection of the flexible cable to the lever;

wherein resilient biassing means are associated with the brake and wherein the auxiliary member and the lever have corresponding toothed surfaces, the toothed surface of the auxiliary member being urged into engagement with a region of the toothed surface of the lever as a result of the pull exerted through the flexible cable by the resilient biassing means associated with the brake.

11. A brake-operating device for cycles, motorcycles and the like, comprising:

a lever;

a support structure to which the lever is articulated about an axis;

an auxiliary member carried by the brake-operating lever;

means provided for adjusting the position of the auxiliary member relative to the lever;

a flexible brake-operating cable connected to the lever; and means for adjusting the distance between the axis of articulation of the lever and an axis of the flexible cable near the point of connection of the flexible cable to the lever;

wherein the auxiliary member is constituted by a pin guided slidably in the operating lever and provided with an appendage which defines a threaded hole, an adjustment screw being engageable in said hole.

* * * * *

UNITED STATES PATENT OFFICE
CERTIFICATE OF CORRECTION

Patent No. 4,903,799　　　　　　　　　Dated February 27, 1990

Inventor(s) Antonio Romano

It is certified that error appears in the above-identified patent and that said Letters Patent is hereby corrected as shown below:

In column 2, line 47, before "DESCRIPTION" insert therefore --DETAILED--.
In column 2, line 68, change "engagemtn" to --engagement--.
In column 3, line 13, delete "15" insert therefore --13--.
In column 3, lines 39,40, delete " articulation axis 14 of the operation lever and the".
In column 3, line 64, between "the line" insert therefore --articulation axis 14 of the operating lever and the--.
In column 4, line 15, delete "articulation" and insert --rotation--.

On the cover page, after the inventor insert --Assignee: Campagnolo S.p.A.--.

Signed and Sealed this

Twenty-first Day of July, 1992

Attest:

DOUGLAS B. COMER

Attesting Officer　　　　Acting Commissioner of Patents and Trademarks